(12) United States Patent
Harris et al.

(10) Patent No.: US 12,389,194 B1
(45) Date of Patent: Aug. 12, 2025

(54) LOCATION-BASED FOOD PREP LABELING SYSTEM

(71) Applicant: CyberDynamite, LLC, Knoxville, TN (US)

(72) Inventors: Eli Harris, Knoxville, TN (US); Cole Harris, Knoxville, TN (US)

(73) Assignee: CyberDynamite, LLC, Knoxville, TN (US)

( * ) Notice: Subject to any disclaimer, the term of this patent is extended or adjusted under 35 U.S.C. 154(b) by 338 days.

(21) Appl. No.: 18/054,953

(22) Filed: Nov. 14, 2022

Related U.S. Application Data (60) Provisional application No. 63/263,954, filed on Nov. 12, 2021.

(51) Int. Cl.
*H04W 4/021* (2018.01)
*H04W 4/33* (2018.01)
*H04W 76/14* (2018.01)

(52) U.S. Cl.
CPC ............. *H04W 4/021* (2013.01); *H04W 4/33* (2018.02); *H04W 76/14* (2018.02)

(58) Field of Classification Search
CPC ........ H04W 4/33; H04W 4/021; H04W 76/14
USPC ...................................................... 455/456.1
See application file for complete search history.

(56) References Cited

U.S. PATENT DOCUMENTS

| | | | |
|---|---|---|---|
| 2014/0204401 A1* | 7/2014 | Salerno | B41J 3/4075 |
| | | | 358/1.6 |
| 2014/0244526 A1* | 8/2014 | Georges | G06Q 30/018 |
| | | | 705/317 |
| 2016/0127600 A1* | 5/2016 | Beatty | H04N 1/00244 |
| | | | 358/1.15 |
| 2020/0327531 A1* | 10/2020 | Rogers | G06Q 20/3224 |
| 2022/0083979 A1* | 3/2022 | Gulati | G06F 16/9536 |
| 2023/0020205 A1* | 1/2023 | Hull | G06K 15/005 |

* cited by examiner

*Primary Examiner* — Hirdepal Singh
(74) *Attorney, Agent, or Firm* — Merchant & Gould, P.C.

(57) ABSTRACT

A method of pairing a user device with a food prep label printer may provide two or more printers, each of the two or more printers, each of the two or more printers located at a geographic location corresponding to a restaurant. When a user device is at the geographic location of the restaurant, a user is prompted to locate the user device proximate to one of the two or more printers corresponding to the restaurant. Two or more printers on the user device to determine the one of the two or more printers that are proximate to the user device may be wirelessly sampled. The user device may be paired to the one of the two or more printers proximate to the user device. Food label data may be received on the one of the two or more printers that is proximate to the user device.

9 Claims, 8 Drawing Sheets

LOCATION-BASED FOOD PREP LABELING SYSTEM

CROSS-REFERENCE TO RELATED APPLICATION

This application claims priority to and is a non-provisional of U.S. Patent Application Ser. No. 63/263,954 for a "Food Prep Labelling System" filed on Oct. 12, 2021, the contents of which are incorporated herein by reference in its entirety.

FIELD

This disclosure relates to the field of restaurants and food preparation. More particularly, this disclosure relates to a system and related methods of generating food preparation labels through a printer using a user device.

BACKGROUND

Restaurants typically require that food be labeled for organization and ensuring that the restaurant complies with various food safety protocols. Proper food labelling ensures that foods are stored at correct temperatures and are being handled and stored properly according to various factors such as when that food was received and how long the food may remain fresh for use.

Various existing labelling systems exist, such as by filling out labels by hand. Other more advanced systems rely on printers and other devices to create labels for foods or food containers. However, existing systems typically require specialized hardware to be connected to printers, increasing cost and complexity associated with using these systems and thereby decreasing the likelihood they will be properly used. For example, a restaurant may be required to purchase specialized computers or devices to interface with printers. Technical problems may further exist, such as technical compatibility of various devices with a printer and communication between devices and printers.

What is needed, therefore, is a system and method of creating food labels that allows a user's device to readily connect with a nearby printer and create food labels from the user's device.

SUMMARY

In some aspects, the techniques described herein relate to a location-based method of pairing a user device with a food prep label printer, the method including: providing two or more printers, each of the two or more printers having a wireless communication module, each of the two or more printers located at a geographic location corresponding to a restaurant; providing a user device having a display and a location module; when the user device is at the geographic location corresponding to the restaurant, prompting a user through the display of the user device to locate the user device proximate to one of the two or more printers corresponding to the restaurant; wirelessly sampling the two or more printers on the user device to determine the one of the two or more printers that is proximate to the user device; pairing the user device to the one of the two or more printers that is determined to be proximate to the user device; and receive food label data on the one of the two or more printers that is determined to be proximate to the user device from the user device.

In some aspects, the techniques described herein relate to a location-based method 1 further including: providing a food prep label server in wireless communication with the user device over a network; storing food label data associated with a plurality of restaurants on the food prep labeling server, the food label data corresponding to one or more of the plurality of restaurants; receiving a location of the user device; in response to receive a location of the user device, determining whether one of the plurality of restaurants is at the location of the user device; in response to determining that one of the plurality of restaurants is at the location of the user device, retrieving food label data associated with the one of the plurality of restaurants at the location of the user device; and displaying the food label data associated with the one of the plurality of restaurants at the location of the user device on the display of the user device.

In some aspects, the techniques described herein relate to a location-based method 2 further including: storing food label format data associated with a plurality of restaurants on the food prep labeling server; and in response to determining that one of the plurality of restaurants is at the location of the user device, retrieving food label format data associated with the one of the plurality of restaurants at the location of the user device.

In some aspects, the techniques described herein relate to a location-based method 3, further including populating data of a food label on the user device based on the food label format data associated with the one of the plurality of restaurants at the location of the user device.

In some aspects, the techniques described herein relate to a location-based method 2, wherein: when the user device is determined to be proximate to two or more of the plurality of restaurants, displaying the two or more restaurants on the display of the user device; receiving from the user device an input selecting one of the two or more restaurants displayed on the display of the user device; and retrieving food label data associated with the selected one of the two or more restaurants displayed on the display of the user device.

In some aspects, the techniques described herein relate to a location-based method of pairing a user device with a food prep label printer, the method including: providing a food prep label server in wireless communication with the user device over a network; storing food label data associated with a plurality of restaurants on the food prep labeling server, the food label data corresponding to one or more of the plurality of restaurants; receiving a location of the user device; in response to receive a location of the user device, determining whether one of the plurality of restaurants is at the location of the user device; in response to determining that one of the plurality of restaurants is at the location of the user device, retrieving food label data associated with the one of the plurality of restaurants at the location of the user device; and transmitting the food label data associated with the one of the plurality of restaurants at the location to the user device for printing on a food label printer at the one of the plurality of restaurants at the location of the user device.

In some aspects, the techniques described herein relate to a location-based method 6 further including: storing food label format data associated with a plurality of restaurants on the food prep labeling server; and in response to determining that one of the plurality of restaurants is at the location of the user device, retrieving food label format data associated with the one of the plurality of restaurants at the location of the user device.

In some aspects, the techniques described herein relate to a location-based method 6, wherein: when the user device is determined to be proximate to two or more of the plurality of restaurants, receiving from the user device an input selecting one of the two or more restaurants displayed on the display of the user device; retrieving food item data associated with the selected one of the two or more restaurants displayed on the display of the user device.

In some aspects, the techniques described herein relate to a location-based method 6, further including: receiving a receipt date of a food item from the user device; determining an expiration date of the food item based on the receipt date received from the user device; and populating a field of the food label with the determined expiration date.

In some aspects, the techniques described herein relate to a location-based method of pairing a user device with a food prep label printer, the method including: providing a food prep label server in wireless communication with the user device over a network; storing food label data associated with a plurality of restaurants on the food prep labeling server, the food label data including a format of a food label corresponding to one or more of the plurality of restaurants; receiving a location of the user device; in response to receive a location of the user device, determining whether one of the plurality of restaurants is at the location of the user device; in response to determining that one of the plurality of restaurants is at the location of the user device, retrieving food label format data associated with the one of the plurality of restaurants at the location of the user device; and transmitting the food label format data associated with the one of the plurality of restaurants at the location to the user device for populating a food label with the user device at the one of the plurality of restaurants at the location of the user device.

BRIEF DESCRIPTION OF THE DRAWINGS

Further features, aspects, and advantages of the present disclosure will become better understood by reference to the following detailed description, appended claims, and accompanying figures, wherein elements are not to scale so as to more clearly show the details, wherein like reference numbers indicate like elements throughout the several views, and wherein:

DETAILED DESCRIPTION

Various terms used herein are intended to have particular meanings. Some of these terms are defined below for the purpose of clarity. The definitions given below are meant to cover all forms of the words being defined (e.g., singular, plural, present tense, past tense). If the definition of any term below diverges from the commonly understood and/or dictionary definition of such term, the definitions below control.

Figure 1:
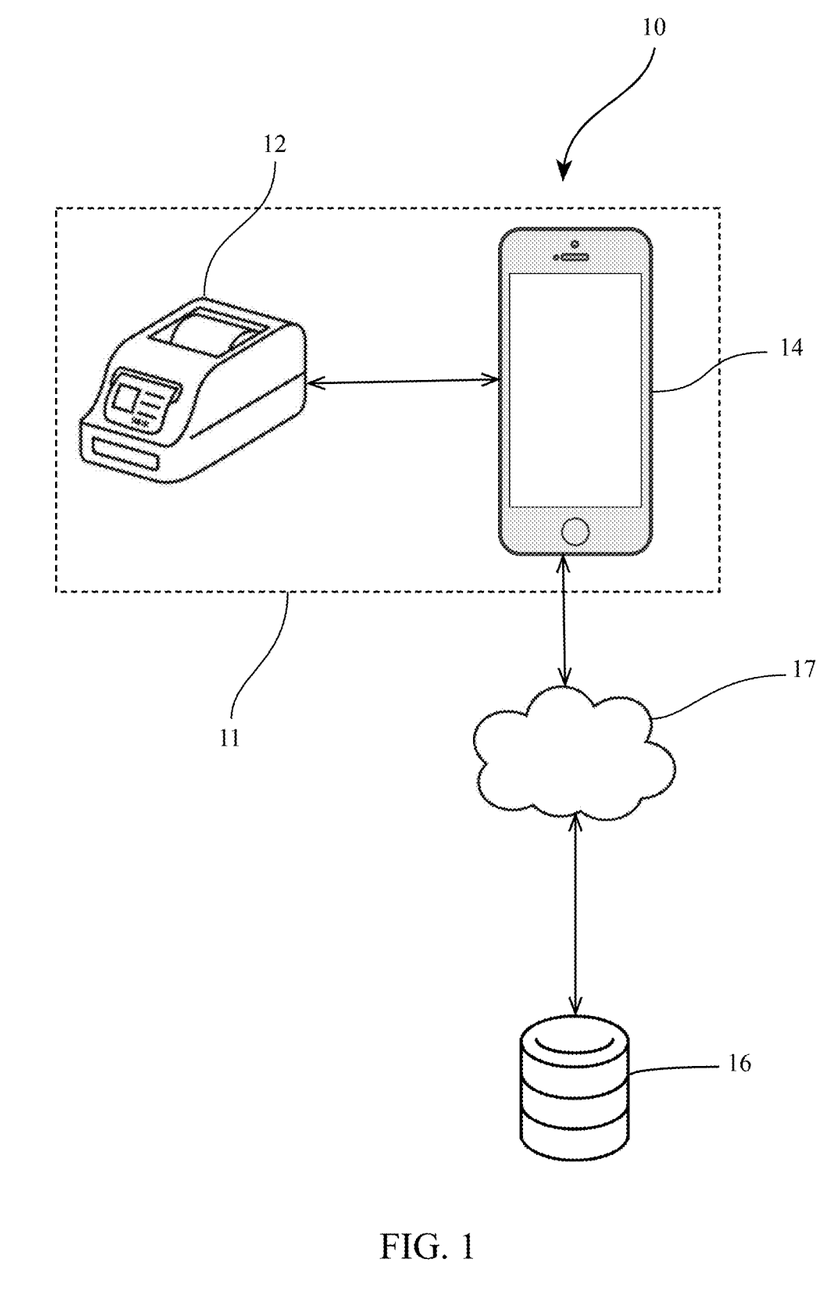
FIG. 1 shows a schematic diagram of a food prep labelling system according to one embodiment of the present disclosure.

FIG. 1 shows a food prep labelling system 10. The food prep labelling system 10 includes one or more printers 12, a user device 14, and a food prep label server 16. The user device 14 is in electronic communication with the food prep label server 16, such as over a network 17. The user device 14 may be in wireless communication with the food prep label server 16 over the network 17, such as via the internet. The food prep labelling system 10 allows for a user to generate a food label on the one or more printers 12 using the user device 14 from the user device 14. The food prep labelling system 10 advantageously allows a user to connect to the one or more printers 12 with the user device 14 and to print a generated label from the one or more printers 12 for application to a food product or food container. Retrieval and display of ingredients and labels on the user device 14 and printing of the labels from the printer 12 may be based on the user device being in geographic proximity to a restaurant 11.

Figure 2:
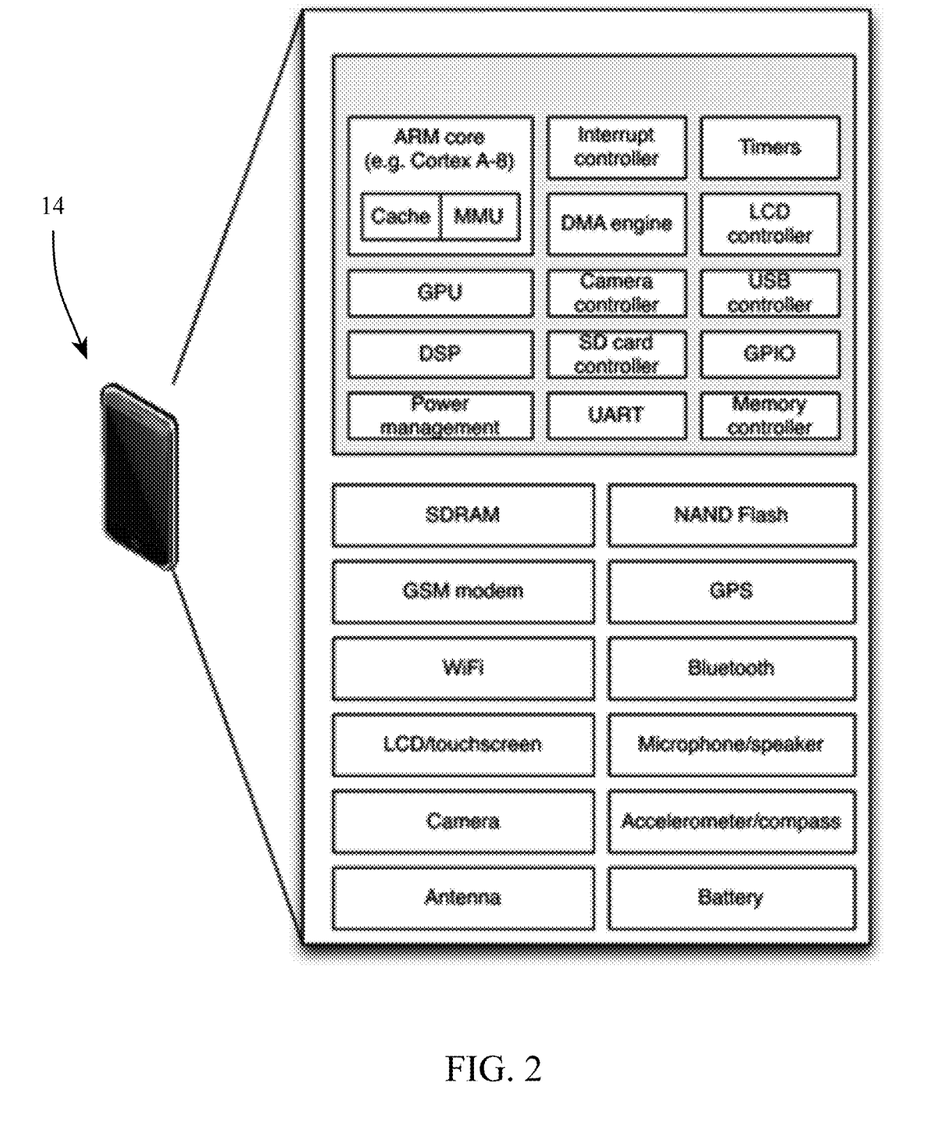
FIG. 2 shows a schematic view of a user device according to one embodiment of the present disclosure.

Referring to FIG. 2, the user device 14 is preferably a smart phone, tablet, laptop, or other personal computing device. The user device 14 includes a display 18 and one or more user input elements. The one or more user input elements may include a touchscreen of the display, stylus, mouse, or other input element that allows a user to input information on the user device 14 for creating a label. The user device 14 may further include a location module, such as a GPS antenna, for determining a geographic location of the user device 14 as described in greater detail below.

Figure 3A:
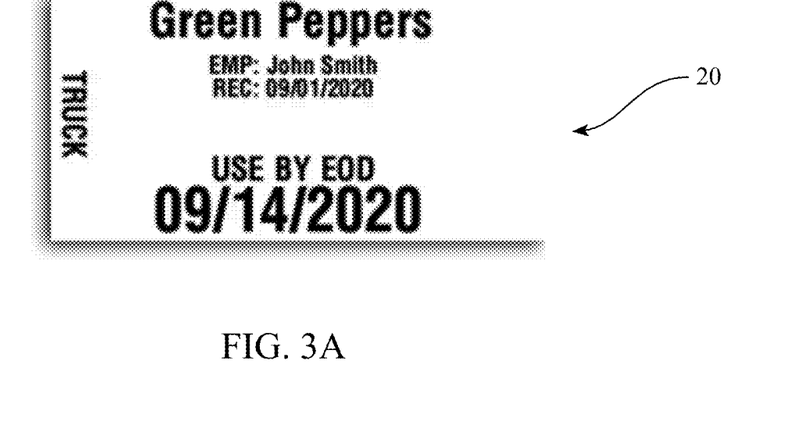
FIGS. 3A-3C show examples of printed labels according to one embodiment of the present disclosure.
Figure 3B:
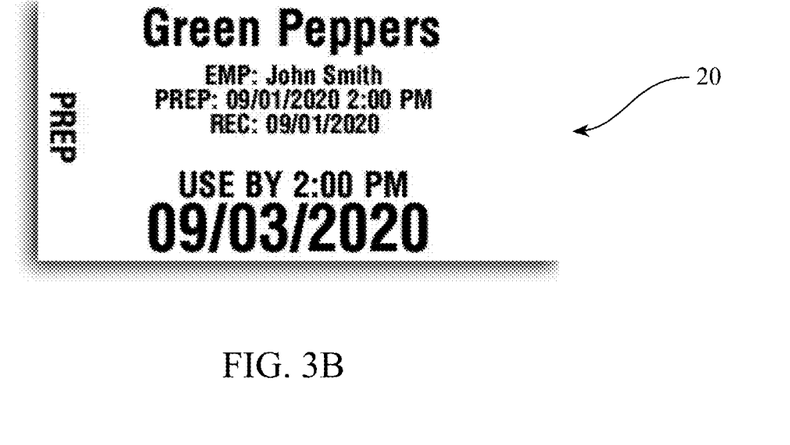
Figure 3C:
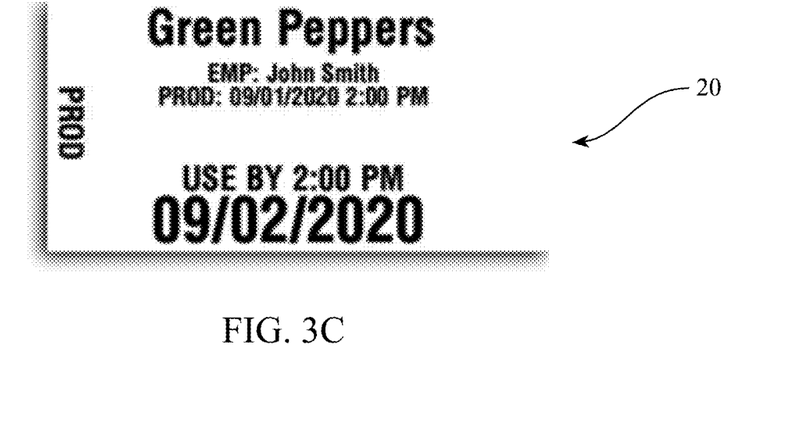

The one or more printers 12 may include a printer suitable for printing labels for food products. For example, a suitable printer may include a thermal printer that is capable of printing indicia on a label that is safe for use with food. The one or more printers 12 are preferably capable of receiving and transmitting data for printing on a label wirelessly, such as via WIFI or Bluetooth. Referring to FIG. 3A-FIG. 3C, the printer 12 is configured to print one or more labels 20. The one or more labels 20 may be labels used in a restaurant for receiving various ingredients and preparing foods with those ingredients.

FIG. 3A shows a "received" label, which may be used with unopened boxes of foods received from vendors. The "received by" date and "use by" date may be automatically determined based on the date that a particular product is delivered. For some items, a user may be required to enter a package expiration date based on a package expiration date printed on a received box foods or ingredients. FIG. 3B shows a "prep" or "use by" label for use with a food product that has been prepared. On the prep label, a "use by" date is shown that is automatically calculated based on a day that the particular food product is prepared. The label 20 may further include a "received by" date or a package expiration date. FIG. 3C shows a label for a produce after production and use. Elements of the label may be manually edited as described in greater detail below.

Figure 4:
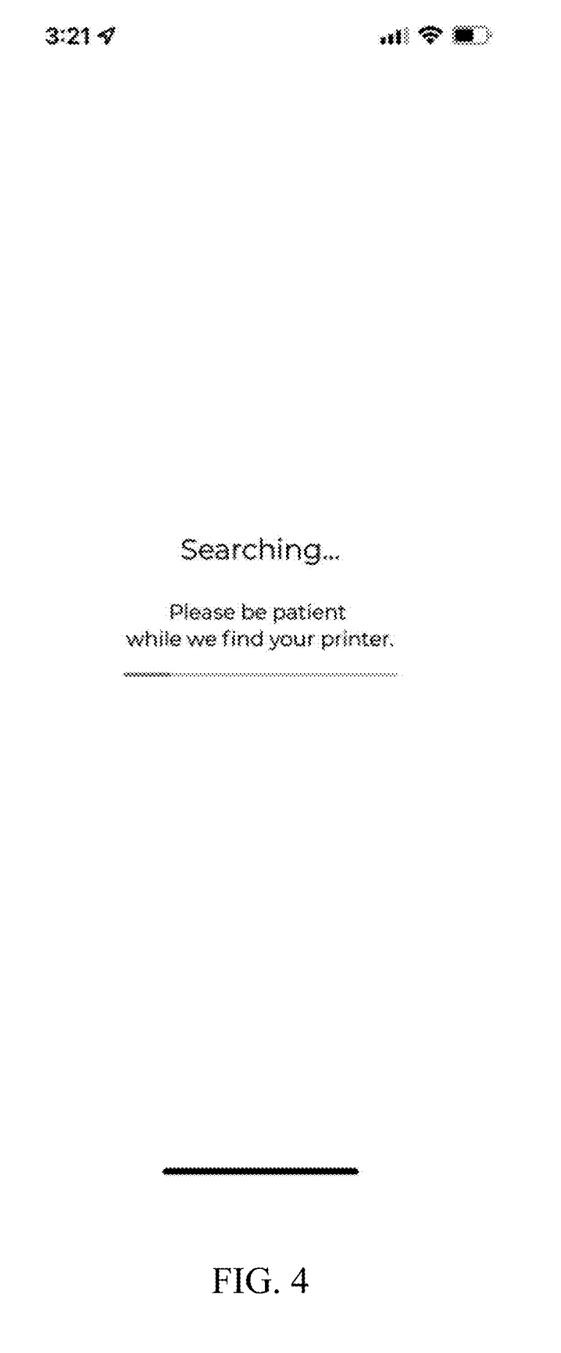
FIG. 4 shows a screenshot of a user device locating a printer according to one embodiment of the present disclosure.

Referring again to FIG. 1, the user device 14 wirelessly communicates with the one or more printers 12. For example, the user device 14 may communicate wirelessly with the one or more printers 12 over Bluetooth or WiFi. As shown in FIG. 4, on a user interface of the user device 14 the user device 14 may search for any printers located in proximity to the user device 14. For example, the user device 14 may determine any of the one or more printers 12 within wireless proximity of the user device 14, such as any of the one or more printers 12 within Bluetooth range of the user device 14. If a plurality of the one or more printers 12 are detected within proximity of the user device 14, the user is prompted on a display of the user device 14 to place the user device 14 nearest to a printer that the user desires to print from. The user device 14 may determine a closest of the one or more printers, such as with a sampling algorithm, and the user device 14 may then wirelessly connect with the desired printer. This further prevents the user device 14 from connecting to other nearby printers that are at a separate business or restaurant location.

Figure 5:
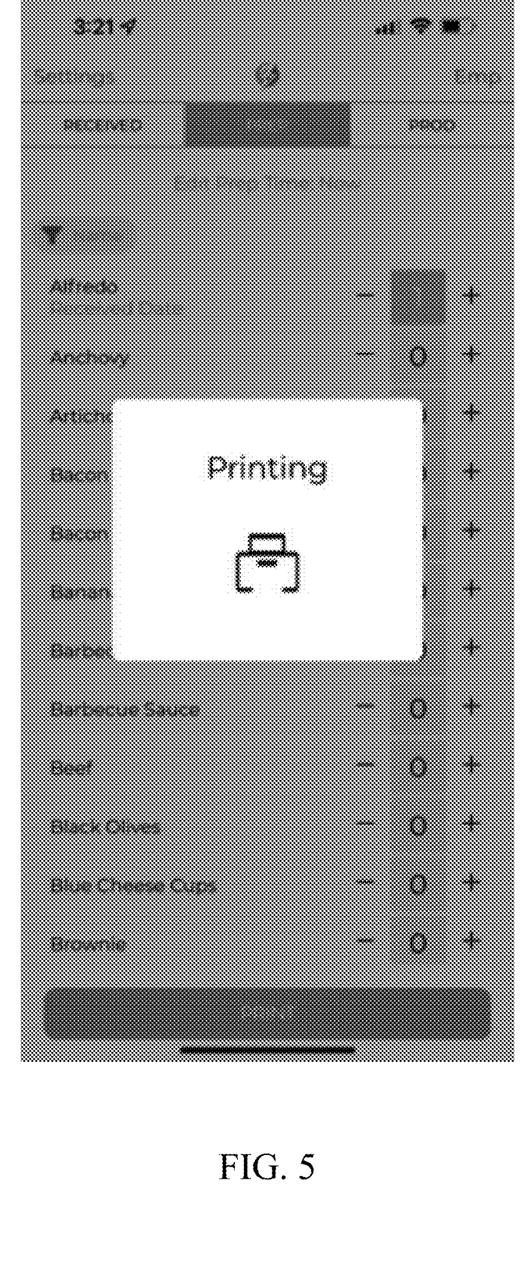
FIG. 5 shows a screenshot of a list of ingredients of a particular restaurant according to one embodiment of the present disclosure.

The user device 14 may communicate with the food prep label server 16 over a network, such as over the Internet. The food prep label server 16 may store data associated with a plurality of restaurants. For example, data stored on the food prep label server 16 may correspond to a plurality of different restaurants, with each restaurant having its own particular ingredients or food items. FIG. 5 shows a screenshot of a user interface displaying various ingredients of a particular restaurant on the user device 14. For example, the ingredients shown in FIG. 5 may correspond to a pizza restaurant. In one example, particular ingredients may be stored on the food prep label server 16 and associated with a particular restaurant franchise. When a restaurant is created on the food prep label server 16, ingredients of that franchise may be assigned to that particular restaurant. Each food item or ingredient may have predetermined lengths of time by which a food item or ingredient must be used. For example, each restaurant may include data related to each food item or ingredient and how long that food item or ingredient may be used at the restaurant before the food item should be discarded.

Further, one or more label designs or layouts may be stored on the food prep label server 16 in association with a particular restaurant or franchise. A geographic location of each restaurant may be stored on the food prep label server 16. For example, an address or GPS coordinates of each restaurant is stored on the food prep label server for each of the plurality of restaurants.

Figure 6:
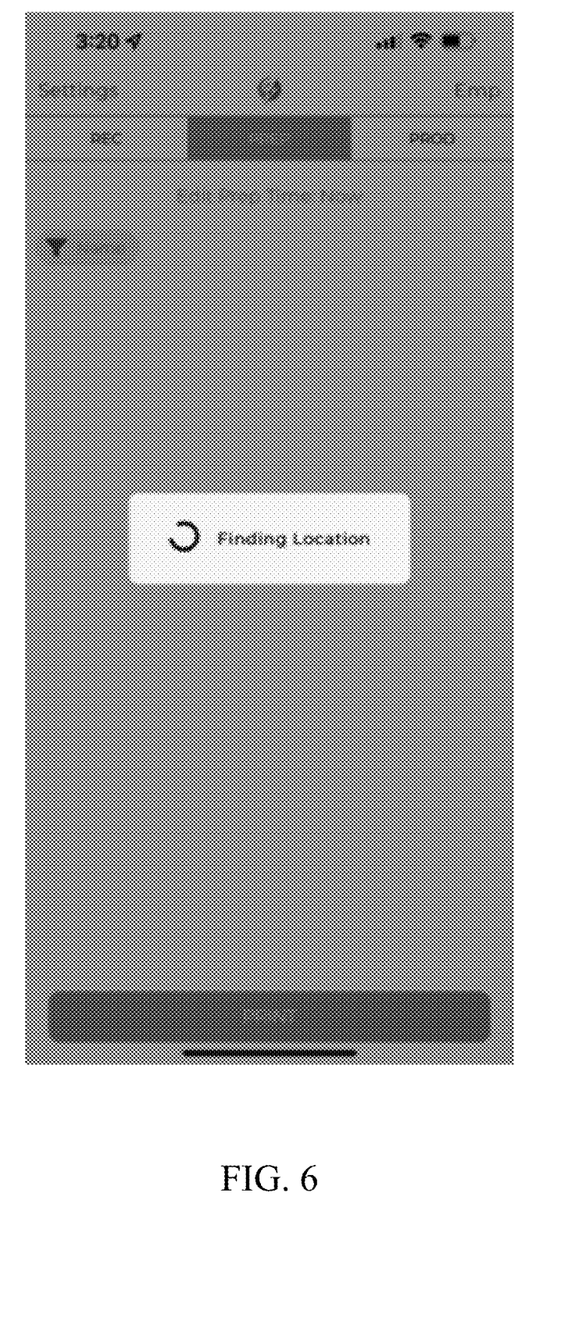
FIG. 6 shows a screenshot of a user device determining a location of the user device according to one embodiment of the present disclosure.

Referring to FIG. 6, when a user accesses an application operable on the user device 14, a geographic location of the user device 14 is determined. For example, a geographic location of the user device 14 may be determined with a GPS antenna of the user device 14. The geographic location of the user device 14 is transmitted to the food prep label server 16. In response to receiving the geographic location of the user device 14, the food prep label server 16 determines whether a restaurant stored on the food prep label server 16 is located at or in proximity to the geographic location of the user device 14. If more than one restaurant on the food prep label server 16 is in proximity to the user device 14, the plurality of restaurants is displayed to the user on the user device 14, such as in a list, such that the user may select the appropriate restaurant corresponding to a location of the user device 14.

Figure 7:
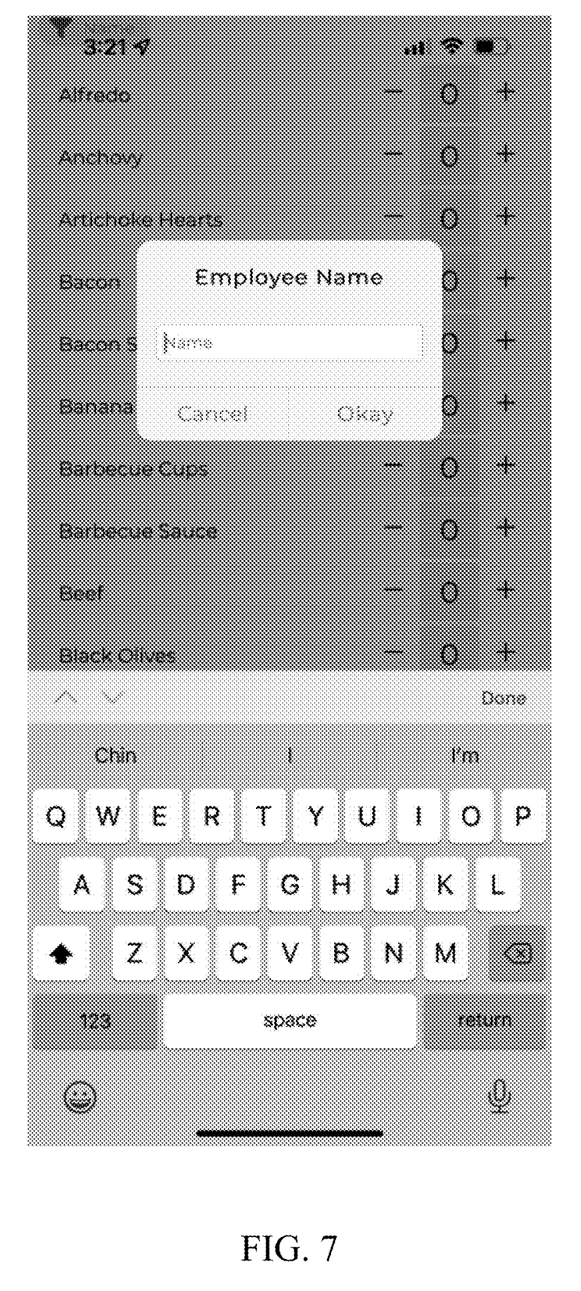
FIG. 7 shows a screenshot of a user interface on the user device according to one embodiment of the present disclosure.

After determining an appropriate restaurant based on a geographic location of the user device 14, food items or ingredients 22 are displayed on the user device 14 as shown in FIG. 5. The food items or ingredients are retrieved from the food prep label server 16 as being associated with the particular restaurant where the user device 14 is determined to be located. The user may select an employee button 24 and input a name of the particular user creating labels on the user device 14 as shown in FIG. 7.

Figure 8:
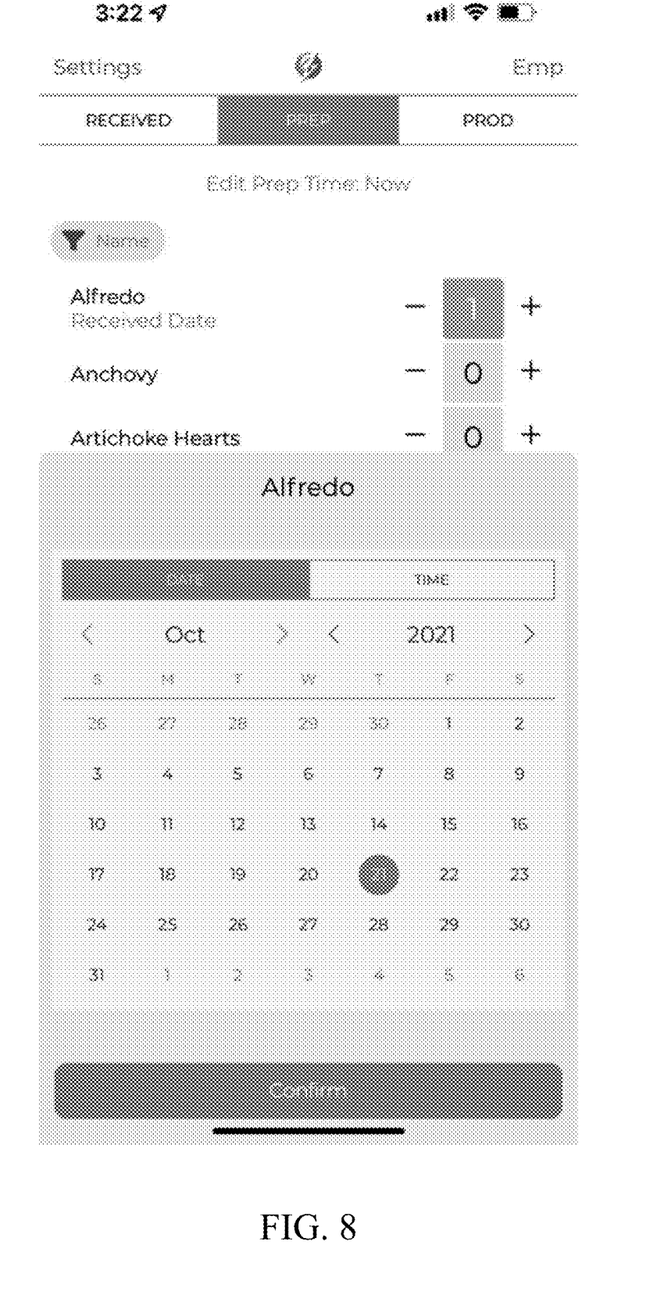
FIG. 8 shows a screenshot of a user interface on the user device for inputting data for a particular food item or ingredient according to one embodiment of the present disclosure.

When the food items or ingredients 22 are displayed on the user device 14, a user may select a particular food item or ingredient to create a label for a container or box of that food item. As shown in FIG. 8, the user may select the food item or ingredient 22. The user may then be prompted to input data related to the food item or ingredient 22 for a resulting label to be printed. For example, as shown in FIG. 8 the user may select a received date of the food item or ingredient. Based on the received date, the food prep label server 16 may determine other data to print on the label, such as a use by or expiration date of the food item or ingredient. The user may further select a number of labels to be printed. After inputting data related to the food item, the user may then print the label from the desired printer. The label may be printed according to a particular label format associated with the restaurant on the food prep label server 16.

The user may advantageously access the list of food items or ingredients 22 associated with a particular restaurant without requiring the user to create or maintain a user account on the food prep label server 16. By retrieving various food items or ingredients and a corresponding label format for a restaurant based on a geographic location of the user device 14, the user is not required to log in to determine a particular restaurant that the user may access. Other advantages include allowing a user to print labels from a personal user device. The food prep labelling system 10 may further ensure consistent application of rules regarding use of food items or ingredients across restaurants and reduces errors related to use of food items or ingredients at the restaurant.

The foregoing description of preferred embodiments of the present disclosure has been presented for purposes of illustration and description. The described preferred embodiments are not intended to be exhaustive or to limit the scope of the disclosure to the precise form(s) disclosed. Obvious modifications or variations are possible in light of the above teachings. The embodiments are chosen and described in an effort to provide the best illustrations of the principles of the disclosure and its practical application, and to thereby enable one of ordinary skill in the art to utilize the concepts revealed in the disclosure in various embodiments and with various modifications as are suited to the particular use contemplated. All such modifications and variations are within the scope of the disclosure as determined by the appended claims when interpreted in accordance with the breadth to which they are fairly, legally, and equitably entitled.

What is claimed is:

1. A location-based method of pairing a user device with a food prep label printer, the method comprising:
   providing two or more printers, each of the two or more printers having a wireless communication module, each of the two or more printers corresponding to a restaurant;
   providing a user device having a display and a location module;
   providing a food prep label server in wireless communication with the user device and with the two or more printers over a network;
   when the user device is at a geographic location corresponding to the restaurant, prompting a user through the display of the user device to locate the user device proximate to one of the two or more printers corresponding to the restaurant;
   wirelessly sampling the two or more printers on the user device to determine the one of the two or more printers that is proximate to the user device;
   pairing the user device to the one of the two or more printers that is determined to be proximate to the user device; and receive food label data on the one of the two or more printers that is determined to be proximate to the user device from the user device;

storing food label data associated with a plurality of restaurants on the food prep labeling server, the food label data corresponding to one or more of the plurality of restaurants;

receiving a location of the user device;

in response to receive a location of the user device, determining whether one of the plurality of restaurants is at the location of the user device;

in response to determining that one of the plurality of restaurants is at the location of the user device, retrieving food label data associated with the one of the plurality of restaurants at the location of the user device; and displaying the food label data associated with the one of the plurality of restaurants at the location of the user device on the display of the user device.

2. The location-based method of pairing a user device with a food prep label printer of claim 1 further comprising:

storing food label format data associated with a plurality of restaurants on the food prep labeling server; and in response to determining that one of the plurality of restaurants is at the location of the user device, retrieving food label format data associated with the one of the plurality of restaurants at the location of the user device.

3. The location-based method of pairing a user device with a food prep label printer of claim 2, further comprising populating data of a food label on the user device based on the food label format data associated with the one of the plurality of restaurants at the location of the user device.

4. The location-based method of pairing a user device with a food prep label printer of claim 1 wherein:

when the user device is determined to be proximate to two or more of the plurality of restaurants, displaying the two or more restaurants on the display of the user device;

receiving from the user device an input selecting one of the two or more restaurants displayed on the display of the user device; and retrieving food label data associated with the selected one of the two or more restaurants displayed on the display of the user device.

5. A location-based method of pairing a user device with a food prep label printer, the method comprising:

providing a food prep label server in wireless communication with the user device over a network;

storing food label data associated with a plurality of restaurants on the food prep labeling server, the food label data corresponding to one or more of the plurality of restaurants;

receiving a location of the user device;

in response to receive a location of the user device, determining whether one of the plurality of restaurants is at the location of the user device;

in response to determining that one of the plurality of restaurants is at the location of the user device, retrieving food label data associated with the one of the plurality of restaurants at the location of the user device; and transmitting the food label data associated with the one of the plurality of restaurants at the location to the user device for printing on a food label printer at the one of the plurality of restaurants at the location of the user device.

6. The location-based method of pairing a user device with a food prep label printer of claim 5 further comprising:

storing food label format data associated with a plurality of restaurants on the food prep labeling server; and in response to determining that one of the plurality of restaurants is at the location of the user device, retrieving food label format data associated with the one of the plurality of restaurants at the location of the user device.

7. The location-based method of pairing a user device with a food prep label printer of claim 5, wherein:

when the user device is determined to be proximate to two or more of the plurality of restaurants, receiving from the user device an input selecting one of the two or more restaurants displayed on the display of the user device;

retrieving food label data associated with the selected one of the two or more restaurants displayed on the display of the user device.

8. The location-based method of pairing a user device with a food prep label printer of claim 5, further comprising:

receiving a receipt date of a food item from the user device;

determining an expiration date of the food item based on the receipt date received from the user device; and populating a field of the food label with the determined expiration date.

9. A location-based method of pairing a user device with a food prep label printer, the method comprising:

providing a food prep label server in wireless communication with the user device over a network;

storing food label data associated with a plurality of restaurants on the food prep labeling server, the food label data including a format of a food label corresponding to one or more of the plurality of restaurants;

receiving a location of the user device;

in response to receive a location of the user device, determining whether one of the plurality of restaurants is at the location of the user device;

in response to determining that one of the plurality of restaurants is at the location of the user device, retrieving food label format data associated with the one of the plurality of restaurants at the location of the user device; and transmitting the food label format data associated with the one of the plurality of restaurants at the location to the user device for populating a food label with the user device at the one of the plurality of restaurants at the location of the user device.

* * * * *